US005872521A

United States Patent [19]

Lopatukin et al.

[11] Patent Number: 5,872,521

[45] Date of Patent: Feb. 16, 1999

[54] METHOD AND APPARATUS FOR MARKING MESSAGES IN SELECTIVE CALL RECEIVERS

[75] Inventors: Eugene Lopatukin, Boynton Beach; Frank Falcone, Loxahatchee; Jennifer Yates, Margate, all of Fla.

[73] Assignee: Motorola, Inc., Schaumburg, Ill.

[21] Appl. No.: 939,503

[22] Filed: Sep. 29, 1997

Related U.S. Application Data

[63] Continuation of Ser. No. 520,619, Aug. 30, 1995, abandoned.

[51] Int. Cl.[6] .......... H04Q 1/00

[52] U.S. Cl. .......... 340/825.44; 455/38.1

[58] Field of Search .......... 340/825.44; 455/38.1

[56] References Cited

U.S. PATENT DOCUMENTS

| | | | |
|---|---|---|---|
| 4,821,021 | 4/1989 | Ide | 340/825.44 |
| 5,153,579 | 10/1992 | Fisch | 340/825.44 |
| 5,157,391 | 10/1992 | Weitzen | 340/825.44 |

*Primary Examiner*—Brian Zimmerman
*Attorney, Agent, or Firm*—Philip P. Macnak

[57] ABSTRACT

A selective call receiver device (10) having a processor readable medium of instructions (100) for setting markers (32) in a text message for automatically tabbing to the markers (32) and including a processor (50), message marking and incrementing system (36) and a plurality of tactile keys (30, 22, 24) for manipulating the code (100), and a method for operating the device (10) and for setting markers (32) at selected locations within text messages to facilitate direct access to the portions of the text message marked.

19 Claims, 9 Drawing Sheets

METHOD AND APPARATUS FOR MARKING MESSAGES IN SELECTIVE CALL RECEIVERS

This is a continuation of application Ser. No. 08/520,619, filed Aug. 30, 1995 and now abandoned.

FIELD OF THE INVENTION

This invention relates generally to selective call receivers and their electronic messages, and more particularly, to a selective call receiver device that can set markers in a message for automatically tabbing to the markers and a method for setting markers at selected locations within messages to facilitate direct access to the portions of the message marked.

BACKGROUND OF THE INVENTION

Selective call receivers, such as portable pagers data on information receivers, cellular telephones, personal communicators, and selectively addressed two-way radio receivers, are devices which can receive, and in some instances temporarily store and display, electronic alphanumeric messages, also called pages or selective call signals, transmitted over the airway. Electronic messages come in various forms, including personal messages and mail drop messages. Mail drop messages are electronic data updates resulting from pre-registered services programmed into the device for receiving information on breaking news, sports including scores and statistics, or stock updates. Even more sophisticated selective call receivers are able to receive electronic mail messages from personal computers which may also be classified as mail drop messages.

Conventional selective call receivers store personal and mail drop messages in different areas of memory when received as determined by its management systems. The selective call receiver demodulates, decodes and processes the electronic message received to generate a user readable message on a conventional display screen. Once the electronic message is received, the selective call receiver stores the message and the user is prompted with an audible alert. The user may then retrieve the message from memory for display on the display screen at any desired time until it is deleted by the user. The display screen also facilitates the viewing of options when prompted by user inputs. In conventional devices, the display screen provides at least one line of display for message viewing and includes message icons on a startup screen to indicate the number of messages presently being stored and icons for deleting or locking (presents deletion) messages. When a message icon is activated, the selective call receiver retrieves the message corresponding to the icon from memory.

Messages are retrieved from memory and advanced for reading by buttons or keys. For example, "MENU" and "READ" keys, or the like, assist in finding, pulling up, or deleting the message while horizontal and vertical arrow keys, or scroll keys, advance through a message, messages or menu options in any direction as indicated by the key indicia. Typically, a message is retrieved by advancing a cursor across the screen with the horizontal scroll key until it highlights the desired message icon and pressing the READ key to retrieve the corresponding message for display on the screen. Once the message is activated, the user typically scrolls through the message one line at a time by actuating the vertical/line scroll keys repeatedly to read the message or to reach pertinent information in the message. If the user frequently references particular information in a message, they must scroll through the message in this manner each time. This may require many tedious keystrokes for particularly long messages. The user may advance through the message more quickly going screen-by-screen by activating the horizontal/screen scroll keys, or similar keys, repeatedly, but may miss the data they are looking for if the display screen provides more than one line of display.

The READ and MENU keys, or keys for activating similar options, are used for interrogating messages and manipulating messages, respectively, based on the menu option selected. When a READ, or READ-like, key is activated, the message corresponding to the highlighted message icon is retrieved from memory and displayed via the status screen for interrogating. While some selective call receivers have a preset message display feature that automatically advances the screens at predetermined time intervals, the READ key may also be used to interrupt this feature to stop the automatic scrolling. When the MENU or MENU-like key is actuated, a list of available options is indicated on the status screen with identification icons. The options made available usually include saving or deleting a message, and "locking" or "unlocking" a message to prevent or facilitate deleting, respectively.

It is common today to preprogram a pager with a message preview feature. This feature displays the first line or screen of a stored message on the startup screen when the corresponding message icon is highlighted by the cursor. The message preview feature, however, is usually useless for electronic and mail drop messages since these messages typically have standard headers with no valuable information in the first line or screen of the message to identify the message. If the message is not identifiable by the preview message on the startup screen, then the user must activate the message and scroll through it to identify the message and its source, thus defeating the purpose of the message preview.

Finally, selective call receiver memory/tier capacity for receiving and storing messages is becoming increasingly sophisticated for storing longer messages such as electronic mail, mail drops, and files. Consequently, message preview features are becoming obsolete and referencing messages for particular data is now less convenient. For instance, new high tier alpha-numeric pagers are projected to be capable of storing thousands of characters as personal messages and as mail drop messages. However, portable devices are limited in the number of characters they may display per screen (80 characters per screen for the typical pager). Therefore, a user may have to scroll through many screens before reading an entire message or finding needed data within the message. Since scrolling through the message is done by hitting a line scroll or screen scroll key, many keystrokes are normally required to advance a message to a target point. This is especially common for mail drop messages or electronic mail messages having hundreds or even thousands of characters and standard headers preceding the relevant information. Message preview features are also being rendered useless by standard headers, since headers usually take up the first screen of a message without revealing any valuable information for identifying the message. Moreover, many users repeatedly reference certain types of information in a message, such as, identification data including names, addresses and phone numbers, stock information, sports scores, etc., and would welcome a device that could automatically advance to commonly used data. Accordingly, even though selective call receivers, such as portable paging devices, are becoming increasingly sophisticated, these high tier alpha-numeric products are making it burdensome for their users to read messages and quickly reference common areas of interest within a message, and are rendering message preview features obsolete.

Since many service providers will continue to use standard headers for their mail drop pages, and since the size of messages being transmitted to selective call receivers will continue to increase, a more efficient means and friendlier selective call receiver for reading and scanning messages is needed. As current selective call receiver products do not provide enhanced features for quickly referencing information in a message on a repeated basis, an automatic message marking, tabbing and advancing feature for sorting through messages and directly advancing to marked areas of a message would be well received.

SUMMARY OF THE INVENTION

With the current increase in capacity of alpha-numeric high tier paging products, there exists a need for text message reading features that will enhance the interfacing between the selective call receiver and its user to simplify the interrogation and referencing of received text messages. The instant invention addresses these needs by providing an improved selective call receiver device having enhancement code that adds message marking features and options to current selective call receiver architecture allowing the user to set at least one marker at selected locations in a text message for facilitating automatic reference. Therefore, the instant invention generally comprises a selective call receiver device having enhancement code, means for setting markers at predetermine locations in a text message, means for advancing directly to and between the message markers, means for removing message markers and means for user interface. The instant invention also teaches a method of marking messages at desired locations in a text message with active message marker icons having tab advance features that allow the message to be automatically scrolled to each marker by the press of one key. The instant invention allows users to directly advance to the marked point indicated by the marker icon in the message for viewing that portion of the text message on the screen. In an alternative embodiment, the instant invention also allows pagers programmed with the message preview feature to select the line, lines, or screen which they desire to have displayed on the startup screen.

The method of the instant invention generally comprises activating a text message; scrolling the text message to a desired point; setting a marker which may include activating a predetermined key programmed for marking the desired point with a marker; displaying the marker; and storing the location of the marker. The method may further comprise activating a key programmed for directly looping to the closest marker in succession.

DESCRIPTION OF THE PREFERRED EMBODIMENT

Figure 1:
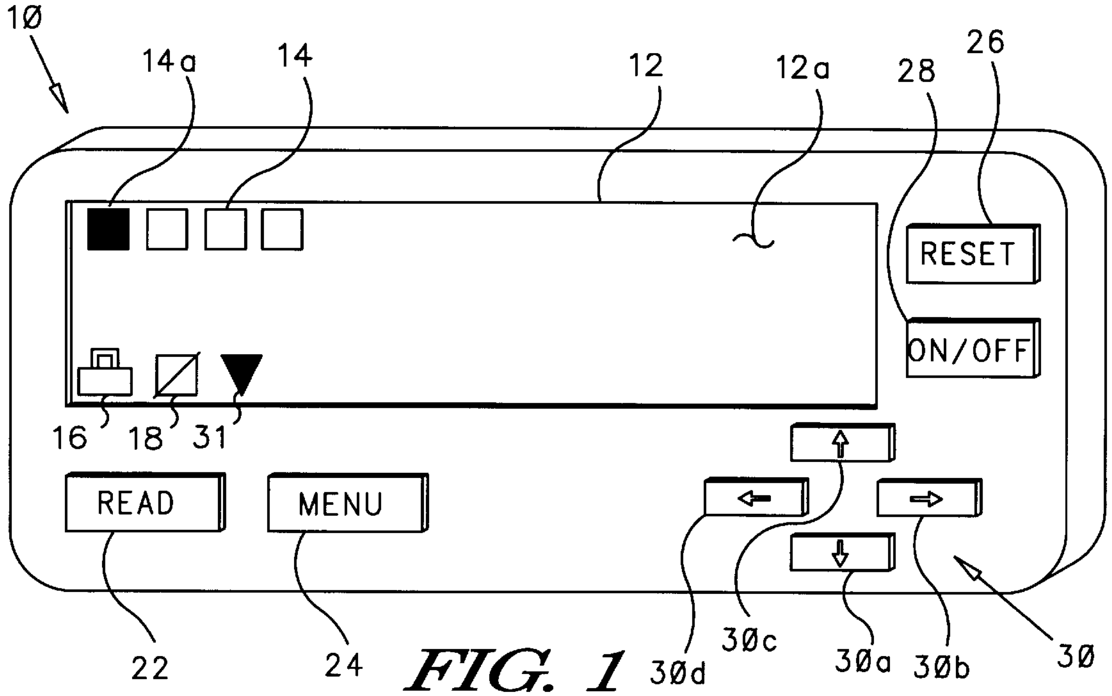
FIG. 1 is a perspective view of the selective call receiver of the instant invention, illustrating the user interface with the instant invention.
Figure 1A:
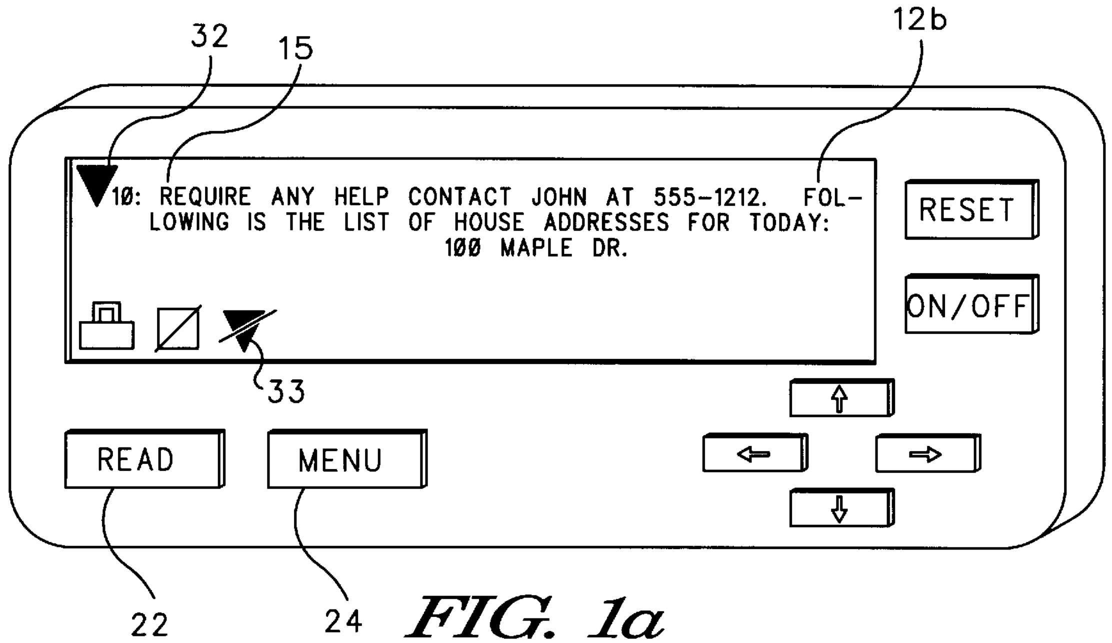
FIG. 1A is a view of the display screen in the READ mode, illustrating the placement of a message marker at the top of the screen and the DELETE message marker icon and the line illustrating menu options.

With reference to FIGS. 1–5, the drawings depict a selective call receiver 10 and code 100 in accordance with the instant invention where the code 100 further comprises the method of the instant invention. In accordance with the instant invention, a selective call receiver 10 with enabling code 100 having an interactive message marking means comprises a message marker 32 and means for directly accessing marker as shown in FIGS. 1, 1A. The message marking means is programmed into the selective call receiver 10 and may include an individual user interface key 34 shown in FIG. 5 or, preferably, may be integrated with existing keys so as to allow the user to place at least one message marker 32 at any desired point such as at a line 15 or screen 12 of the message. In accordance with the instant invention, existing selective call receivers may be programmed and upgraded with a message marking means to be described below. Existing selective call receivers may require modification to existing selective call receiver code to employ the code 100 of the instant invention, the operating sequence of which would be activated by the press of a predetermined key or keys.

Figure 2:
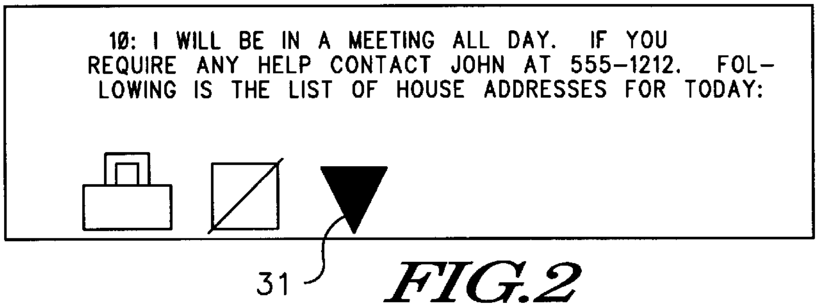
FIG. 2 is a view of the display screen of the selective call receiver of the instant invention in the READ mode, illustrating a message and the available menu options, more particularly, the message marker icon which may be activated to place a message marker.
Figure 3:
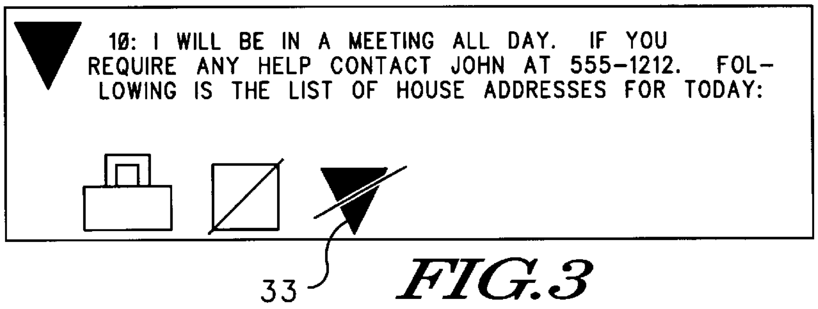
FIG. 3 is a view of the startup screen of the selective call receiver of the instant invention in the READ mode, illustrating the placement of a marker at the top of the screen, where it is preferably placed when activated after the message has been scrolled to its desired point, and further illustrating the message marker delete icon in the menu options, which is activated by the user to erase a message marker.

The selective call receiver 10 of the instant invention further incorporates a message marker 32 to be set or deleted as part of the operational sequence of the selective call receiver 10. FIGS. 1–3 provide example screen displays illustrating icons which may be used to identify available options, such as the message marking option. The user which frequently receives large messages may set a message marker 32 in accordance with the instant invention on any screen of the message to target an area of interest. The message marker 32 facilitates a significant reduction in the number of screens or key strokes required to access the target information, especially since as little as one key press would be required for accessing the first message marker 32 in any message regardless of its textual location. Once the message marker 32 is set, the user can directly access the desired spot in the message with at least one key stroke thereby making the selective call receiver easier to use. Furthermore, in an another embodiment of the instant invention, the message marker 32 can be incorporated with message preview features. The preview feature allows a user to see the first screen or line of a stored message to make it easier for the user to locate the message they want to read.

The selective call receiver 10 of the instant invention comprises a message marking means which is easily understood in terms of the procedure by which a message marker 32 is set. Preferably, a message is scrolled until the segment of the message necessitating quick reference, or message preview is shown on the screen; after which a message marker 32 is placed at that point via user inputs. selective call receiver 10 of the instant invention is designed so that only one message marker 32 needs to be placed per screen of text. While message markers 32 may be set on more than one line in a screen with strategic manipulation of the scroll keys (e.g. setting a message marker at the top of one screen then scrolling the message down one line and setting another marker), this would be pointless for screens 12 having multiple line displays, since advancing to one message marker 32 would display the adjacent line as well.

Figure 4:
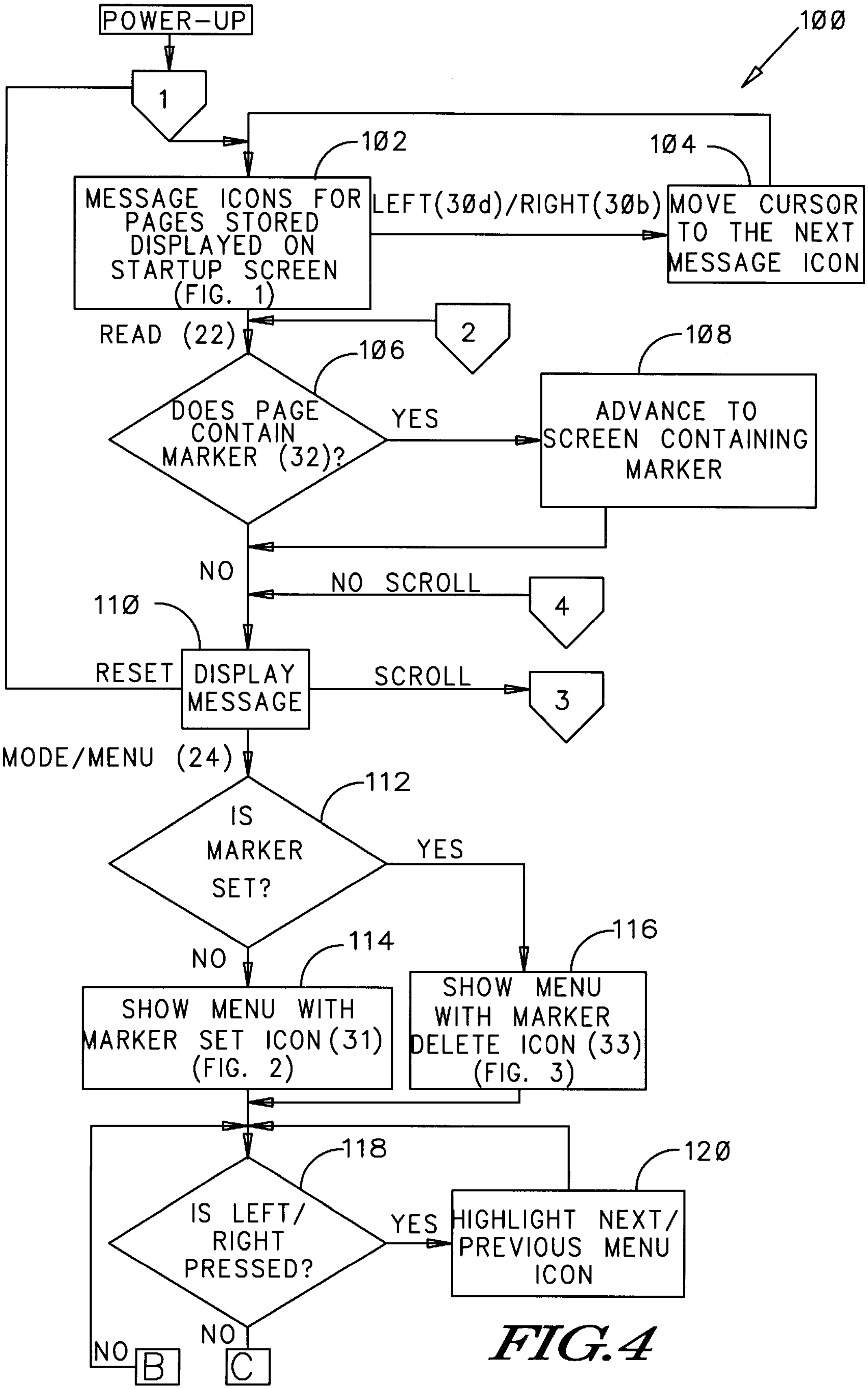
FIG. 4 is a flow diagram of the selective call receiver of the instant invention illustrating the logic flow from a startup screen to setting and removing message markers, and further illustrating the scroll features when displaying a message, wherein the scroll feature may be utilized in several different embodiments.
Figure 4:
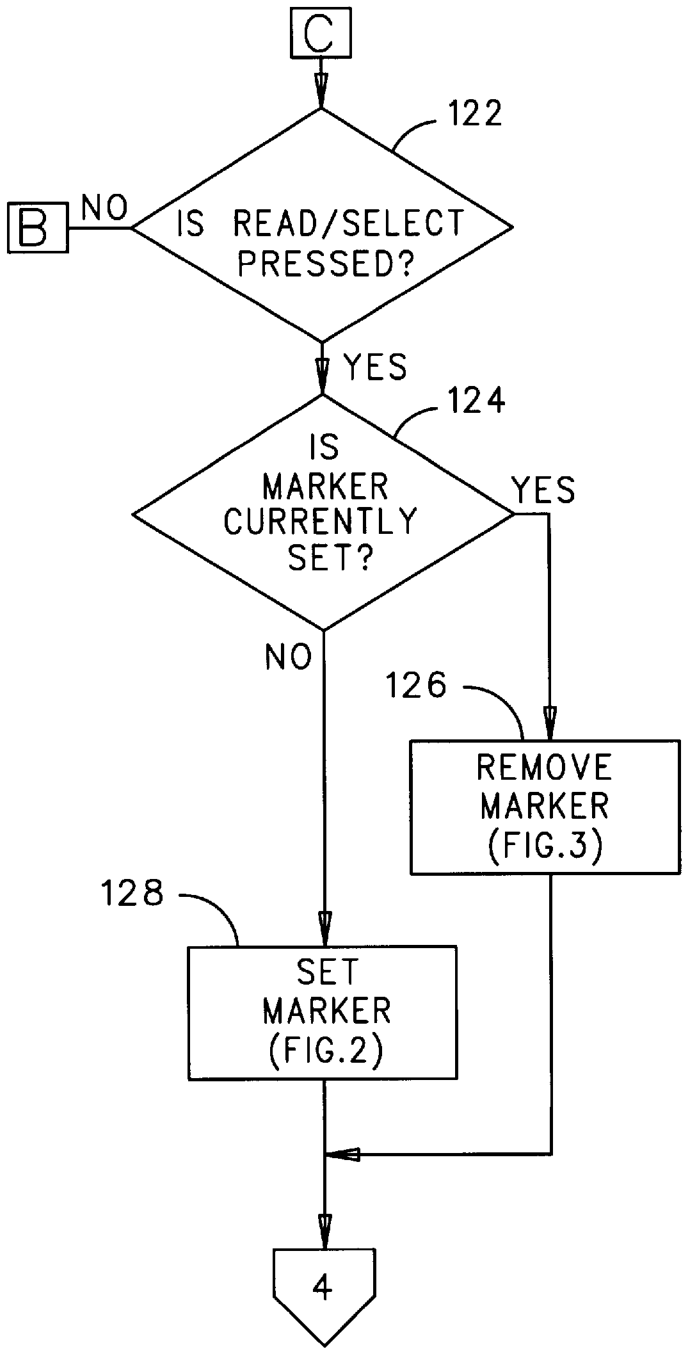
Figure 4A:
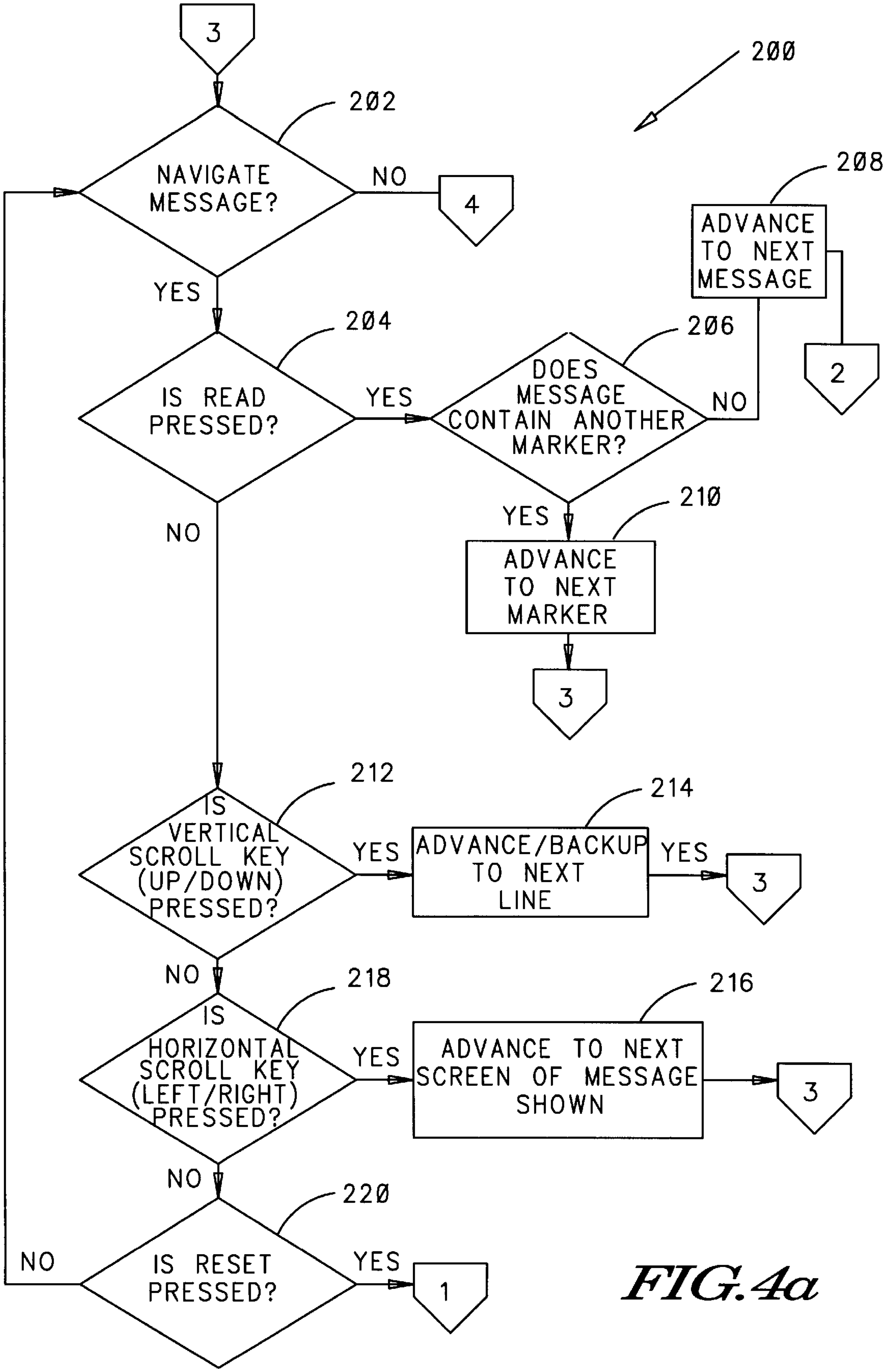
FIG. 4A is a subroutine flow diagram of an embodiment of the selective call receiver of the instant invention illustrating a method and logic pattern for scrolling through a message by message markers, lines and screens, between messages, preferably for use with display screens having one line of message text.

The logic structure of the message marking means of the selective call receiver 10 of the instant invention comprises a computer, or processor, readable medium of instructions or code 100 including the means for setting at least one marker in at least one point of a message selected by user inputs, as depicted in FIGS. 1–5. The code for setting message markers 32 may include the scroll keys 30 to find the place of setting and the READ key 22 to actually set. The scroll and READ keys 30, 22 manipulate the code 100, however, the keys programmed to set markers may vary without departing from the scope of the invention. Once set, the message marking means identifies the point of the message marked with the message marker 32. The selective call receiver 10 and code 100 also include the advancement means for directly advancing to set message markers 32 in a predetermined sequence which is typically in sequential order. Once a message marker 32 is set, the marker advancing means lets a user bypass text preceding the message marker 32 and advance directly to that message marker 32 within the message by manipulating at least a single button/key. The key stroke prompts the code 100 to advance directly to the message marker 32. Subsequent key strokes may advance to the next successive message marker 32 in the message, to the first message marker 32 in the next message once all the message markers 32 have been surfed or it may advance the message by line or screen, depending on the particular keys pressed, as shown in FIGS. 4–4*c*. The order in which message markers 32 are surfed is dependent on the programming of the code 100, discussed further herein. The single key may be either a new key 34 or an existing key, such as MENU 24 or READ 22, placed in communication with the processor 50 by the code instructions 100.

Consequently, the selective call receiver 10 of the instant invention is designed to enhance user interface with conventional and new selective call receiver technology by eliminating the number of keystrokes and steps required to reach desired destinations within a message. The message marking feature of the instant invention can be programmable into conventional selective call receivers or into newly designed selective call receivers adapted with architecture to set, store, indicate, and remove markers as discussed herein, and is adaptable and operational with any style selective call receiver, regardless of the number of options or features. The selective call receiver message marking means of the instant invention further comprises a processor 50, a plurality of tactile response switches 22–30 for prompting the code 100 via the processor 50, and a display screen 12 for viewing user options and messages.

With reference to the preferred embodiment of the instant invention, the selective call receiver 10 generally comprises a message marking and incrementing means 36 comprising a means for setting message markers at predetermined locations in a message, a means for removing message markers previously set and a means for advancing directly to and between set message markers 32. The means for setting message markers 32 comprises at least one key, such as READ 22, dedicated to activating markers at selected locations within the message, a message marking icon 31 which is highlighted by the user with the cursor in the menu mode of the code 100 and activated by the selected key 22, and a message marker 32, or indicia means, which is visually and interactively set proximal the point selected by the user. The message marking means also includes a subroutine of processor readable medium of instructions for operating the message marking icon 31 and message marker 32 for placement.

Figure 1B:
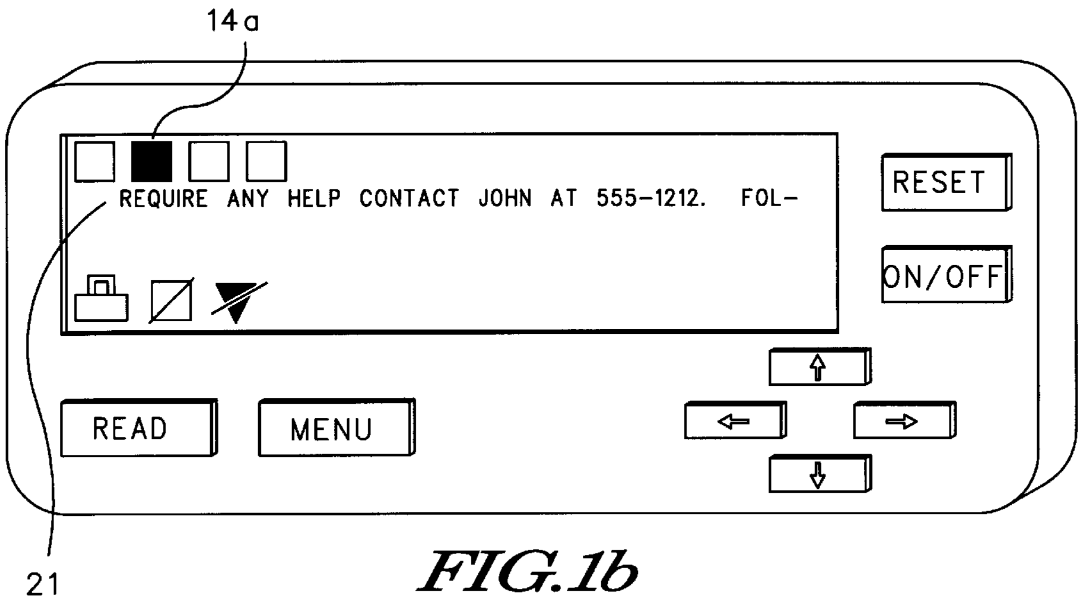
FIG. 1B is a view of the selective call receiver of the instant invention illustrating the startup screen having the message preview feature wherein the line marked in FIG. 1A is programmed to be the message preview line on the startup screen.

When a message is scrolled with the scroll keys 30, a predetermined number of lines of the message are displayed on the display screen 12. If the portion of the message which is displayed does not contain a message marker 32 then the message marking icon 31, as shown in FIG. 1*b* is displayed as a menu option. In addition, if the portion of the message shown on a display screen 12 does not contain a message marker 32 then a message marker 32 will not be displayed adjacent the text. To set a message marker 32, the user may actuate a MENU key 24, or some other key assigned for that function, to activate the menu options. The menu options may already appear on the status screen or may be made to appear by the activation of the MENU key 24. In either event, to activate the menu options, the MENU or MENU-like key 24 should be activated. Once activated, the cursor is activated in the menu and moved along the options preferably with the scroll keys 30*b,d* until highlighting the message marking icon 31, as shown in FIG. 1*b*. Once highlighted, the slot containing the message marking icon 31 is activated and the message marker 32 can be set by pressing a predetermined key, such as the READ key 22. Any key can be selected for manipulating any function of the instant invention without departing from the scope and spirit of the instant invention. When the READ or READ like key 22 is actuated at this point, the message marker 32 is automatically set on the display screen 12, and the point marked is saved in memory 56 until deleted. Preferably, the message marker 32 is set adjacent the first line of the message text displayed on the display screen 12. Accordingly, the message marker 32 would disappear if the message is scrolled down one line. The placement of the message marker 12 on the display screen 12, however, may deviate without departing from the scope and spirit of the instant invention. Once the message marker 32 is set, the code 100 may automatically loops back into the message for interrogating and scrolling through the message or it may require the manipulation of another key to get back into the message. By requiring manipulation of another key, or another key stroke, the user is able to stay in the MENU option subroutine so as to select other menu options. Again, this is optional. For instance, to return to the message scrolling or manipulating subroutine either the MENU key 24 or RESET key 26 can be actuated. When in the message manipulating subroutine, as shown in FIGS. 2 and 4, the user can scroll through the message to find a location for setting another message marker 32 or can scroll into a different message for setting message markers 32.

A similar sequence of steps can be followed to remove a message marker 32 previously set. That is, the menu option subroutine is activated by depressing the MENU option after the message is scrolled to the point displaying the message marker 32. If the message marker 32 is displayed on the display screen, a message marker delete icon 31 is displayed in the menu options and is similarly highlighted with the cursor via the scroll keys 30*b,d* and activated by depressing the READ or a READ like key 22. The message delete icon is as shown in FIG. 3, which is shown highlighted for illustrative purposes.

Figure 5:
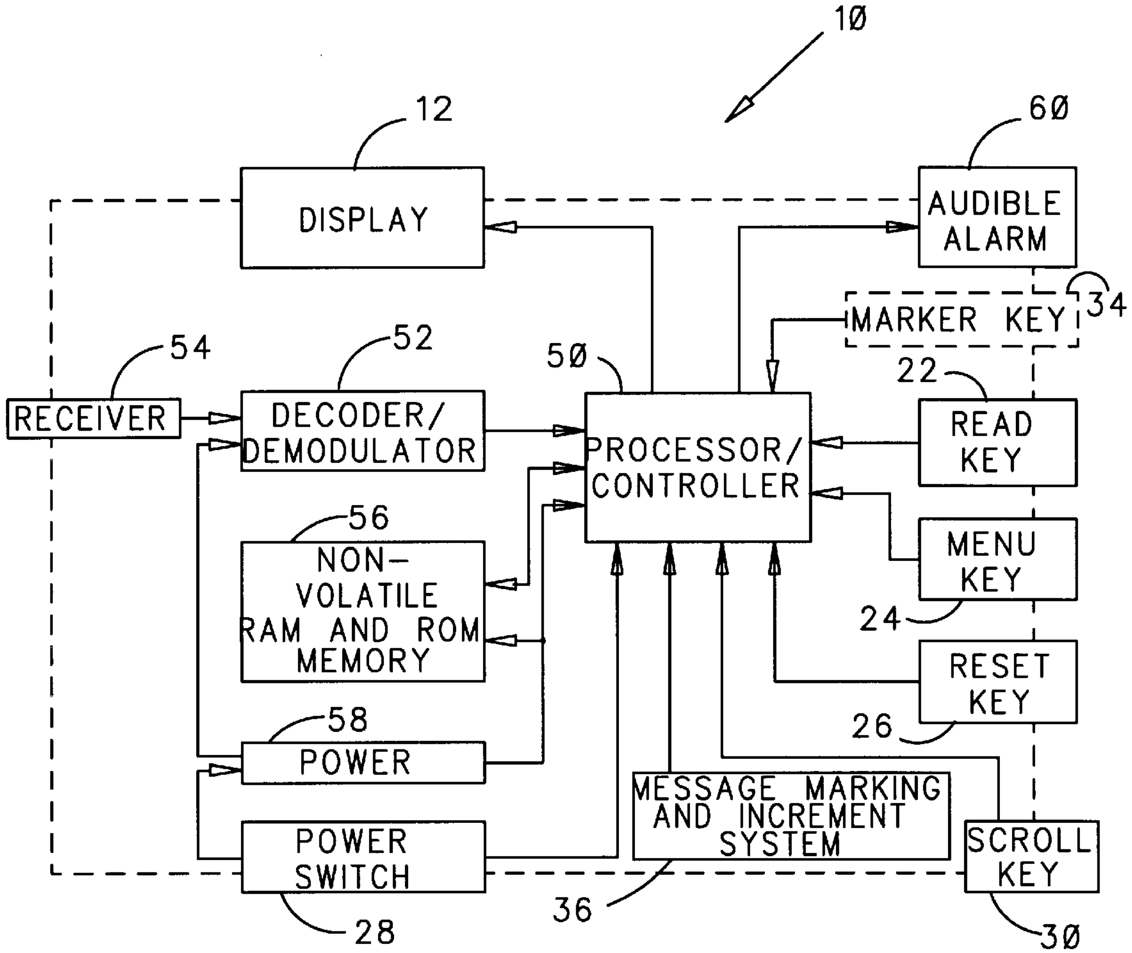
FIG. 5 is a logic block diagram of the selective call receiver illustrating the interaction between the components in accordance with the instant invention.

With reference to FIG. 5, setting and prompting message markers 32 is preferably done by a microprocessor/controller 50 which manipulates code 100 stored in RAM, ROM, scratchpad memory, and/or any currently known non-volatile memory architecture 56 via message marking and incrementing system 36 and user manipulated keys/switches. The user initiates inputs to the processor 50 via tactile keys, such as the MENU key 24, READ key 22, and scroll keys 30, for pulling messages from memory 56, scrolling through messages, setting message markers 32, in the message so that the point or points marked may be automatically referenced. The code 100 is also manipulated to remove or delete message markers 32 previously set.

The code/instructions 100 of the instant invention comprise a series of steps programmed into new and conventional selective call receivers that result in the transformation of data or signals via user interface when setting message markers at selected locations of stored messages. Each message marker 32 set can represent an individual address within the message with that address being stored in memory for later retrieval. When a message is retrieved one segment at a time is displayed on the display screen 12. The user inserts a message marker 32 via a predetermined keystroke at the beginning of the text displayed on the display screen 12. The message marker 32, therefore, may be identified as a separate character which is stored along with the message. After setting a message marker or markers 32, a user may advance directly to the marked or identified spot within the message by manipulating the appropriate key or keys. By actuating the key or keys corresponding to marker message advancement, the code 100 identifies the stored message address of the marker and moves to that portion of the message text. If more than one message marker 32 is placed in the stored message the user can advance directly to those markers as well as with the appropriate key strokes. The address location of the markers are stored in memory 56 and a pointer or index can be used to advance as each message marker 32 is activated. Any key in a selective call receiver can be programmed to advance between message markers 32 and the selective call receiver can be programmed to scroll through the messages in a number of different sequences depending preference, the embodiments of which are discussed herein.

Referring to FIG. 5, the architecture of the selective call receiver 10 of the instant invention generally comprises a processor 50 for receiving user inputs via a plurality of tactile keys, including the READ key 22, the MENU key 24, the RESET key 26, the scroll keys 30, the power switch 28, and in the alternative, a marker key 34, to process code in non-volatile and temporary memory 56. Thus, like conventional selective call receivers, the selective call receiver 10 of the instant invention includes at least one response switch/key in communication with the processor 50, such as a depressible button/key, and typically, three keys 22, 24, and 26, as shown in FIGS. 1 and 5, for storing messages, deleting messages, locking/unlocking messages, interrogating stored messages and accessing a menu of options available in the selective call receiver 10. In contrast with prior art selective call receiver technology, the selective call receiver 10 of the instant invention adds an additional interactive option to the device, that is, the message marking feature or means noted above. The message marking means is adapted for use via scroll keys 30 that scroll through menu options and stored messages. The scroll keys 30 preferably include horizontal scroll 30*b,d* and vertical scroll 30*a,c* keys with complimentary indicia for indicating the scrolling of messages by screens or lines. Any indicia, however, can be employed on the scroll keys 30 to illustrate their operation.

A status/viewing screen 12 having at least one line of display reveals messages pulled from memory, available options and message preview lines as determined by user inputs via the keys, and further provides message updates when new messages are received. While a display screen 12 having at least one line of display is completely operational with the instant invention, as shown in FIG. 4A, a display screen 12 having two or more lines is preferable for implementing message preview features with the message marking means and for facilitating easier reading.

When either the power on/off switch 28 or RESET key 26 is manipulated, a startup screen 12*a* is displayed or activated, as shown in FIG. 1. The display screen 12 typically includes a default screen for displaying message icons 14 and menu options, such as locking/unlocking, saving/deleting and message marking, on the display screen 12, and it includes a movable cursor which is preferably moved by the horizontal scroll keys 30*b,* 30*d* across the message icons 14 and can also be moved by the vertical scroll keys 30*a,* 30*c* between the message and the menu options. If the MENU key 24 is actuated, the cursor is transferred so as to be movable across the menu options. A user can return to the message icons 14 by either stroking the MENU key 24 again, or some other key similarly programmed to move the cursor, such as the vertical scroll keys 30*a,c* or the reset key 26. For instance, the cursor can be moved between the menu icons 14 to the message icons in the startup screen 12*a* by manipulating the vertical scroll keys 30*a,* 30*c* as discussed.

Typically, the display screen 12 has a plurality of slots for displaying message icons 14 corresponding to each message being stored in the selective call receiver 10. The icons 14 are used to select messages for reading. The message icons 14 are generic in design and usually offer no valuable information for identifying the message. When the cursor is moved over a message icon 14, the icon is highlighted and the slot 14*a* becomes activated. Pressing the READ key 22 after a message icon 14 is activated retrieves the corresponding message from memory for reading/interrogating. When a message has yet to be interrogated, the corresponding message icon 14 may blink to indicate the same and it can cease blinking once the message has been read. With reference to FIG. 1, the startup screen 12*a* is shown, illustrating the message icons 14, the active message icon/slot 14*a,* message lock option 16 and message delete option 18, and a message marker identifier 31, or 33.

Referring to FIG. 1A, the message 15, the message marker 32, message marker delete icon 33, message lock icon 16 and message delete icon 18 are shown on the message read or manipulation screen 12*b*. When a message has been prompted, the screen lines display a portion of the message and can also display the menu icons available. To enter the menu, the MENU key 24 is actuated. If a message marker 32 has not been previously set in the portion of the message being displayed, the menu icons will include a message marker set icon 31 instead of a message marker delete icon 33 to allow the user to set a marker 32 on the first line of the portion of the text shown on the current screen by highlighting the message marker set icon 31 and hitting the appropriate key, such as READ 22, programmed for activating markers. As noted, the menu options are activated by activating the MENU key 24. This places the code 100 into a menu subroutine allowing the user to surf the menu icons with the cursor via the horizontal scroll keys 30*b,d* and select a menu option by preferably pressing the READ key 22. The user can automatically return to the message after selecting an option or may be required to press a corresponding key, such as the MENU key 24 or the RESET key 26, to return to the message. Any key, or combination thereof, however, can be chosen to activate or remove the marker 32, to select other options or to return to the message. In another embodiment, a marker button 34 may be added and used to set, remove and activate markers 32.

In an alternative embodiment, the selective call receiver 10 can have message preview, whereby the display screen 12 displays in the startup screen 12*a* the first line or screen of a stored message or a marked line 21 corresponding to an activated message marker 32. With message preview, the preview line or lines change as the cursor highlights different message icons 14 so that the review line corresponds to the message associated with the activated message icon. In conventional selective call receivers, the preview line is always the first line of the message. When the message is marked with at least one message marker, the line corresponding to the first message marker 32 is displayed as the preview message. Thus, the message marking means of the invention allows the user to select the message preview line so that the message preview shows valuable information on the startup screen 12*a* relevant to the message so that it may be easily identified. With reference to FIGS. 1A and 1B, it can be seen that the preview message line 21 displayed on the startup screen 12*a* can be selected with the message marker 32. Typically, the first message marker 32 set in the message corresponds to the preview line, but it can be programmed to select any line for preview.

The preferred embodiment of the instant invention is discussed with reference to selective call receivers having three keys for manipulating the selective call receiver. The instant invention, however, can employ existing keys or a new key 34 to set, remove or advance to message markers 32. The number of keys can vary without limiting the scope of the invention, such that any number of keys can be employed for addressing the selective call receiver's instruction/code 100.

The selective call receiver 10 of the instant invention is described as having a MENU key 24, READ key 22, and a RESET key 26, in addition to horizontal and vertical scroll keys 30 and a power on/off switch 28. The scroll keys facilitate advancing through an individual screen to select menu options or for scrolling through screens, messages, and lines of messages when interrogating a message. The scroll keys 30 include screen/horizontal scroll keys 30*b,* 30*d,* depicted by horizontal arrows, and line/vertical scroll keys 30*a,* 30*c,* depicted by vertical arrows. The arrows are merely a means for identifying particular keys and the direction for moving the cursor and screen. Thus, the scroll keys can be divided into a first scroll set and a second scroll set. The MENU key 24 displays selective call receiver and message related options when actuated, depending on whether the display screen 12 is in the startup screen 12*a* or message display/read screen 12*b.* When the display screen 12 is in the startup screen 12*a,* actuating the MENU key 24 displays options such as saving, deleting 18, and locking/unlocking 16 messages and/or setting/removing 31, 33 message markers 32. In another embodiment, the startup screen 12*a* can provide an identifier icon depicting whether or not the message corresponding to the message icon 14 has a marker 32 set in its text. They message lock 16 prevents a message from being deleted. When a message is activated for interrogation as shown on the status screen 12*b,* the MENU key 24 can be used again to illuminate the menu options available. To select a message from the startup screen 12*a,* the screen scroll keys 30*b,* 30*d* are pressed until the cursor highlights the message icon of interest 14*a,* after which the READ key 22 is actuated to display the corresponding message on the status screen 12. The RESET key 26 is used to return the selective call receiver to its initial or startup screen 12*a* or to loop out of the menu.

Depressing the READ key 22 when a message icon is highlighted activates and displays the corresponding message. The message is then readable line-by-line or screen-by-screen through the manipulation of the scroll keys 30. Once a message is activated, pressing the MENU key 24 displays options on the status screen 12. Any one of these options may be prompted by highlighting the option icon via the screen scroll keys 30 and pressing the READ key 22. Any key, however, can be utilized as an "enter" key for executing the selected option. Any time the RESET key 26 is actuated, the display screen 12 either returns to the startup screen 12*a* or to the message text. The READ key 22 may also be used to advance directly to the message markers 32 in a message each time the key 22 is hit. The READ key 22 may advance through the markers 32 in one message and loop from the last marker to the first marker when reaching the end of the message, or it can advance to the first marker 32 of the subsequent message when reaching the end of the first message. In the alternative embodiment, an additional marker key 34 can be used to advance between markers 32 much like the READ key 22 discussed hereto, with the READ key being reprogrammed to advance directly between messages while in the mode for interrogating a message.

With reference to FIGS. 4–4*d,* the code 100 of the instant invention is illustrated. Referring to FIG. 4, the logic code for selecting a message to interrogate, interrogating the message, setting message markers in the message, removing message markers previously set in the message and selecting other menu options is illustrated. When powering up or resetting the selective call receiver device 10, the startup screen 12*a* is activated. The startup screen 12*a* displays a message icon 14 for each message stored so as to indicate the number of messages stored in the device. See block 102. To select a message a horizontal scroll key 30*b,d* is actuated so as to move the cursor across the message icon 14. See block 104. To activate a message corresponding to the message icon 14, the READ key 22 is actuated. If a selective call receiver device has the message preview feature then the message preview line changes with each activated message icon. Once a message is selected by pressing the READ key, the message is activated. If the message/page contains a message marker 32 then the code 100 advances directly to the screen of the message containing the message marker so as to begin displaying the message on the screen 12 at the point of the marker 32. If the message/page does not contain a marker 32 then it begins the display with the first line of the message. See blocks 106–110.

To select a menu option the MODE/MENU key 24 is actuated. If the current screen display has a marker set at that particular location then the menu of options will include a marker delete icon 33, as illustrated in FIG. 3. See blocks 112 and 116. If the portion of the message being displayed on the screen does not contain a message marker 32 then the menu options will include the message marker set icon 31 as seen in FIG. 2. See block 114. To either set or delete a message marker 32, the horizontal scroll keys 30*b,d* (or a similar type key) are actuated until either the message marker delete icon or message marker set icon 31 is highlighted. See blocks 118 and 120. If the READ/READ-like key 22 is actuated then the menu option currently being highlighted is activated. See block 122. If a message marker 32 has been previously set and currently displayed and the marker delete icon 33 is highlighted then it will be activated by pressing the READ key 22 so as to remove the message marker 32. On the other hand, if a message marker 32 has not been previously set, i.e. is not displayed on the current screen 12*b* and the READ key 22 is actuated while the marker set icon 31 is highlighted then a marker 32 will automatically be set on the first line of the portion of the message currently being displayed. See blocks 124–128. After an option has been selected, such as the removal or setting of markers, the code 100 may return to the startup screen 12*a* or to the message display 12*b* for scrolling through the message.

Figure 4B:
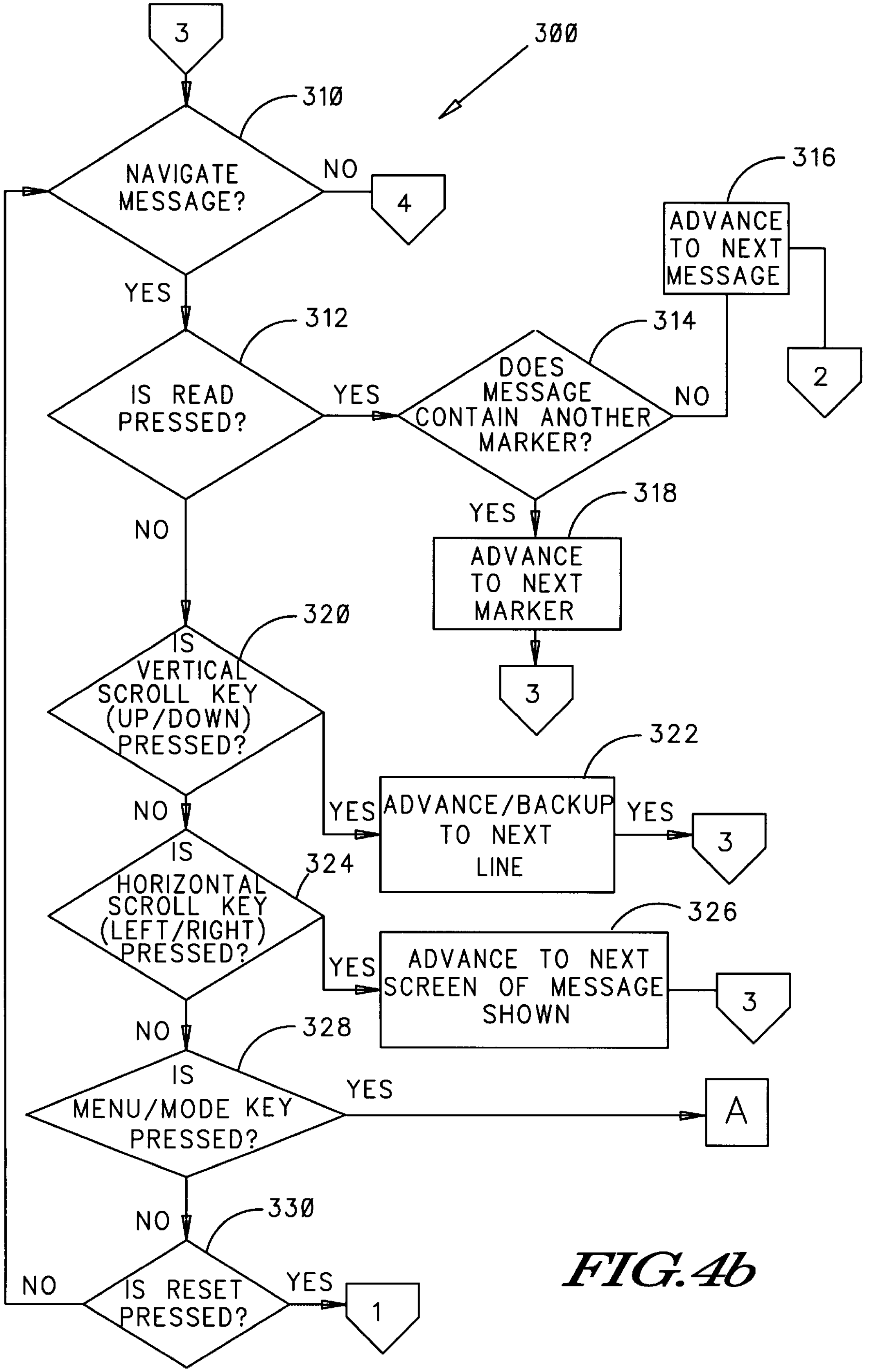
FIG. 4B is a subroutine flow diagram of another embodiment of the instant invention illustrating the scroll feature and further illustrating the logic flow of an option providing a feature for scrolling between messages while the selective call receiver is in the READ mode.
Figure 4B:
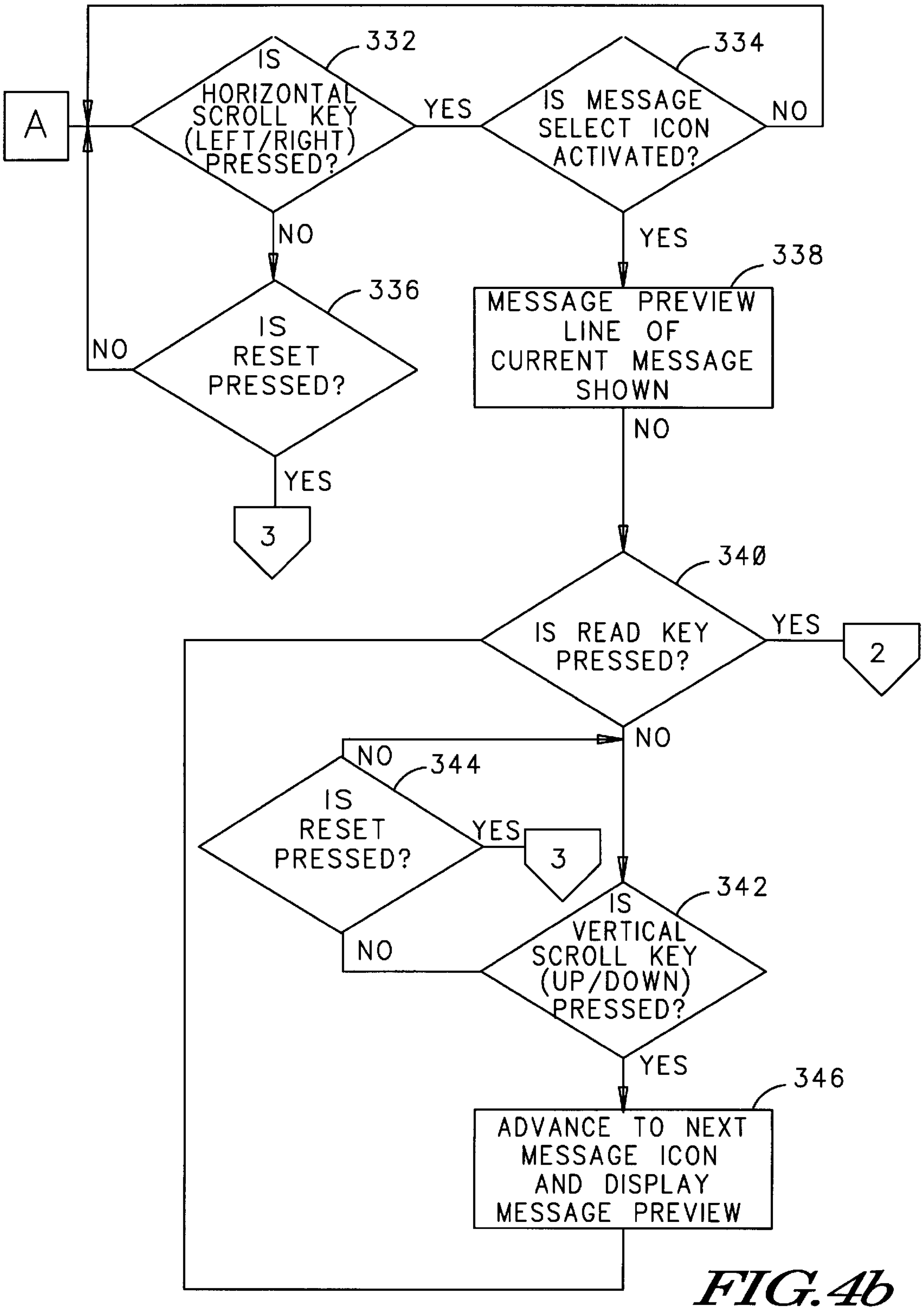
Figure 4C:
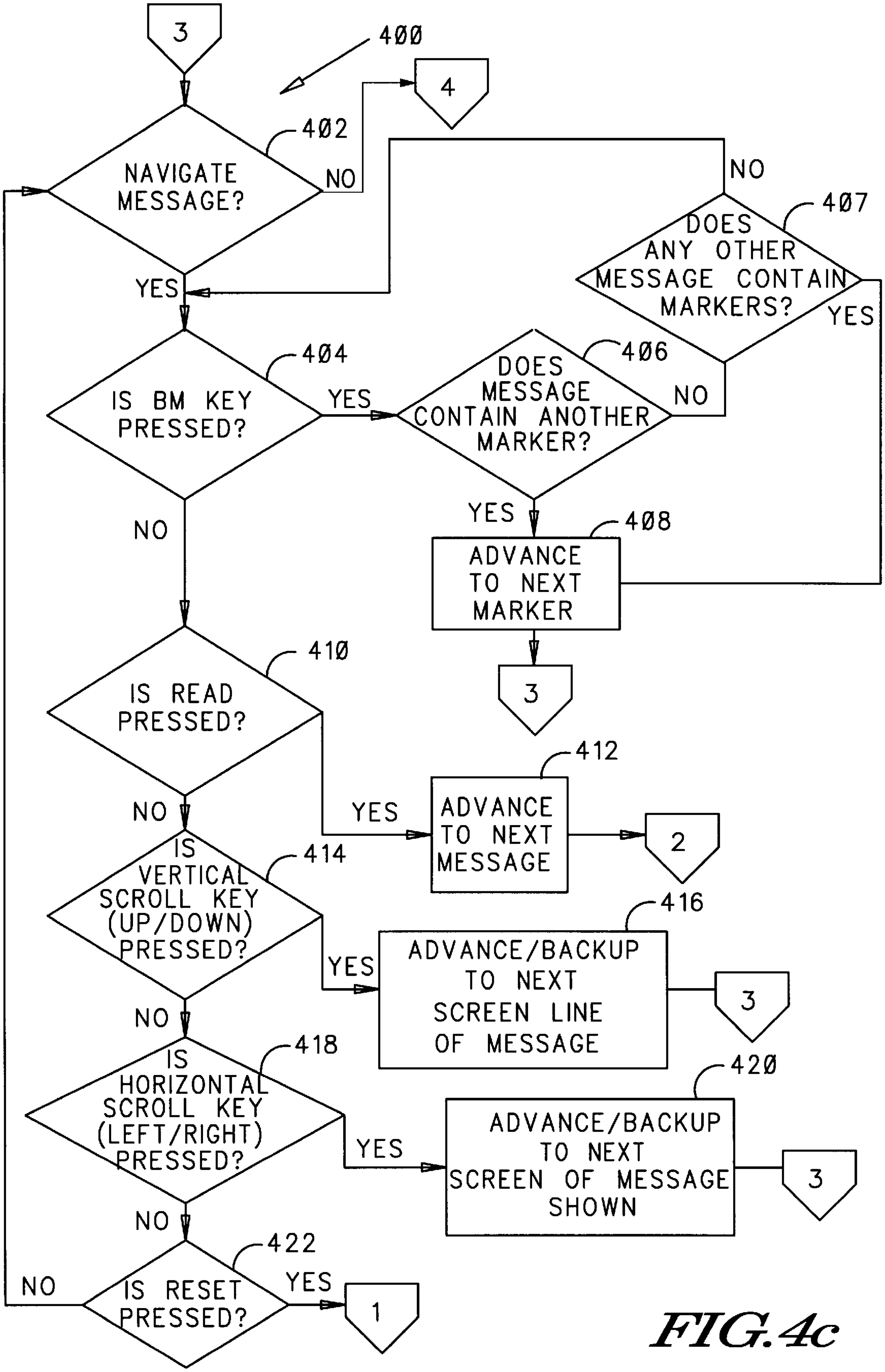
FIG. 4C is a flow diagram of another embodiment of the instant invention for use with display screens having multiple lines of message text, illustrating the selective call receiver with an additional key for advancing through a message via message markers.

Several embodiments exist for scrolling through messages by message markers, lines, screens and between messages as indicated in FIGS. 4*a*–4*c* with each one beginning at point "3". Referring to FIG. 4*a,* if the user decides not to navigate through a message then they remain at the display message point as shown in blocks 110 and 202. In this embodiment, when the user decides to scroll through a message they either actuate the READ key 22 or a scroll key 30. If the READ key 22 is actuated and the message contains a message marker or another message marker 32 then it advances to that next message marker. See blocks 204, 206 and 210. If the message does not contain a message marker 32 or another marker 32 and the READ key 22 is pressed then the selective call receiver device 10 advances to the next message in succession. See block 208. If a vertical scroll key (or similar key) 30*a, c* is actuated in this embodiment then the message is advanced or backed up to the next line and the routine loops back to starting point "3". See blocks 212 and 214. If a horizontal scroll key 30*b,d* (or similarly programmed key) is actuated then the current message advances to either the next screen or previous screen of the message shown depending on which horizontal scroll key is actuated. See blocks 218 and 216. If the RESET key 26 is pressed while a message is being interrogated then the selective call receiver device returns to the startup screen 12*a*. If none of the foregoing keys are actuated then the routine returns or remains at the decision block for determining whether to navigate/scroll through a message.

Referring to FIG. 4*b,* a logic subroutine flow diagram and method of scrolling through a message is depicted along with a feature for previewing messages while in message interrogation screen 12*b*. Once again, beginning at starting point 3, a user decides whether to navigate through a message. See block 310. While interrogating a message, if the user actuates the READ or READ like key 22 and the message contains another marker 32 then the message advances directly to that next marker 32. See blocks 312, 314 and 318. On the other hand if the messages do not contain another message marker 32 and the READ key is pressed then the selective call receiver device advances to the next message in succession and returns to point "2" in FIG. 4. See block 316. Once again, if either the vertical scroll keys or horizontal scroll keys 30*a–d* are actuated then the message is advanced to either a previous or succeeding line or screen, respectively. To activate the message preview during the message interrogation subroutine in this embodiment of the invention, the menu/mode key 24 is actuated. See block 328. After actuating the menu/mode key 24 the horizontal scroll key 30*b,d* should be actuated until a message select icon such as that represented by reference numeral 14 is activated. If a horizontal scroll key is not actuated and the RESET key is pressed instead, then the code 100 returns to point "3" for navigating through the current message. Once the message select icon 14 is activated, the message preview line corresponding to the current message is shown since that is the current message being displayed. See block 338. To preview other messages stored in a selective call receiver device the vertical scroll key 30*a, c* is actuated causing the selective call receiver device to advance to the next message icon so as to display the message preview line 21 corresponding to the present message icon 14. Once the user defines the message preview line of interest the READ key 22, or similar select key, is actuated to select the corresponding message. See blocks 340–346. When selecting a new message the code 100 returns to point "2" of FIG. 4. If at anytime the RESET key 26 is actuated the code returns to the message at point "3" of the code 100.

With reference to FIG. 4*c,* the additional message marking key 34, and code related thereto and the method of use is illustrated. Once again, beginning at 23 the user determines whether to navigate through the message. See block 402. If the message marker key 34 is actuated and the message contains another message marker 32 then the selective call receiver 10 automatically advances to that next message marker 32. If another message marker 32 does not exist in that message then the selective call receiver device may advance to the first marker of the next message in succession or it may remain idle, depending on the programming of the code 100. In this embodiment, anytime the READ key 22 is selected the selective call receiver advances to the next message in succession. As previously discussed, the scroll keys are used to advance through the message either line by line or screen by screen. See subroutine 400 and blocks 402–422.

In summary, a selective call receiver 10 has been described which provides an apparatus and method for marking a message which has been received so as to readily reselect the message for reading at a later time. The markers allow a user to quickly jump through a message and, in the alternative, to select screens for message preview display.

What is claimed is:

1. A selective call receiver for receiving, storing and displaying a text message, comprising:

a receiver for receiving the text message;

a memory for storing the text message;

a display for displaying in a user readable format the text message which is stored;

a user interface for receiving inputs generated by a user for finding and displaying the text message which is stored in said memory;

message marking means, coupled to said user interface, for enabling the user to set and store, while the text message is being displayed, message tabs at selected locations within the text message;

tab incrementing means, coupled to said user interface, for enabling the user to increment to selected portions of the text message which are marked by the message tabs; and message marker indicia which is displayed along with the selected portions of the text message which are marked by the message tabs.

2. The selective call receiver according to claim 1 further comprises message tab deletion means, coupled to said user interface, for enabling the user to delete message tabs previously set and stored while the text message is being displayed.

3. The selective call receiver according to claim 2, wherein said message marking means further comprises message tab identifier, coupled to said display and said user interface, for visually and operatively facilitating the user to selectively set and to selectively delete the message tabs at user selected locations.

4. The selective call receiver according to claim 3, further comprising:

a processor, coupled to said memory, said message marking means, said message tab deletion means, and said tab incrementing means, for processing a setting and deleting of the message tabs and incrementing to the message tabs.

5. The selective call receiver according to claim 4, wherein said message marking means, said message deleting means, and said tab incrementing means comprises:

processor readable medium of instructions, coupled to said processor and said memory.

6. The selective call according to claim 5, wherein said memory is coupled to said message marking means for storing the user selected locations of the message tabs.

7. The selective call receiver according to claim 5, further comprising:

advancement means for enabling the user to scroll through the text message to enable complete reading of the text message by the user.

8. The selective call receiver according to claim 7, wherein said advancement means comprises:

line scrolling means for scrolling through text message one line at a time; and screen scrolling means for scrolling through text message one screen at a time.

9. A selective call receiver for receiving, storing and displaying a text message, comprising:

a receiver for receiving the text message;

a memory for storing the text message received;

a display for displaying in a user readable format the text message which is stored;

a user interface for receiving inputs generated by a user which allow the user to display and manipulate the text message stored in said memory;

processor readable medium of instructions stored in said memory, comprising:

message marking means for enabling a user to set, while the text message is being displayed, message tabs at selected locations within the text message, and tab incrementing means for enabling the user to increment to the selected locations within the text message which are marked by the message tabs;

processor means, coupled to said memory and said user interface for processing the processor readable medium of instructions stored in said memory to enable the user to set and store message tabs and to increment to the selected locations within the text message marked by the message tabs; and message marker indicia which is displayed along with the text message at the selected locations within the text message set by the message tabs.

10. The selective call receiver according to claim 9, further comprising:

advancement means for enabling the user to scroll through the text message to enable complete reading of the text message by the user.

11. The selective call receiver according to claim 10, further comprising:

message marker indicia for visually identifying the message tabs.

12. The selective call receiver according to claim 11, wherein the processor readable medium of instructions further comprises:

message tab deletion means for enabling the user to delete message tabs previously set and stored while the text message being displayed.

13. The selective call receiver according to claim 12, further comprising a message tab identifier, coupled to said display, said user interface and responsive to said processor readable medium of instructions, for visually and operatively facilitating user selective setting and user selective deleting of the message tabs at said user selected locations.

14. The selective call receiver according to claim 13, wherein said advancement means comprises:

line scroll means for scrolling through the text message one line at a time; and screen scroll means for scrolling through the text message one screen at a time.

15. The selective call receiver as recited in claim 14, further comprising:

message preview means, coupled to said display and said message marking means, said message preview means being defined by said processor readable medium of instructions, for displaying at least one line of said text message corresponding to a selected message tab set by said message marking means.

16. A method for navigating through a text message in a selective call receiver which receives, stores and displays the text message to provide for increased flexibility when reading the text message, said method comprising the steps of:

(a) receiving and storing the text message;

(b) presenting the text message stored on a user readable display;

(c) scrolling through the text message which is displayed on the user readable display;

(d) setting at least one message tab in at least one selected location within the text message as the text message is displayed;

(e) displaying a message marker indicia proximal to the selected portion of the text message being displayed which corresponds to the at least one message tab set within the text message; and (f) storing the at least one message tab.

17. The method as recited in claim 16, further comprising the steps of:

displaying a portion of the text message corresponding to a selected message tab on a screen of the user readable display.

18. The method as recited in claim 17, further comprising the steps of:

selectively deleting selected message markers.

19. The method as recited in claim 18, further comprising the steps of:

advancing directly to the at least one message tab by inputs generated by a user for displaying the portion of the text message corresponding to the at least one message tab.

* * * * *